(12) United States Patent
Dugan et al.

(10) Patent No.: US 7,553,105 B1
(45) Date of Patent: Jun. 30, 2009

(54) METHOD AND COMPOSITIONS FOR TREATMENT OF SUBSURFACE CONTAMINANTS

(75) Inventors: Pamela J. Dugan, Golden, CO (US); Robert L. Siegrist, Boulder, CO (US); Michelle L. Crimi, Kingsport, TN (US)

(73) Assignee: Colorado School of Mines, Golden, CO (US)

( * ) Notice: Subject to any disclaimer, the term of this patent is extended or adjusted under 35 U.S.C. 154(b) by 0 days.

(21) Appl. No.: 11/585,417

(22) Filed: Oct. 23, 2006

Related U.S. Application Data

(60) Provisional application No. 60/729,159, filed on Oct. 21, 2005.

(51) Int. Cl.
 *B09C 1/00* (2006.01)
(52) U.S. Cl. .............................. 405/128.75
(58) Field of Classification Search .............. 405/128.1, 405/128.7, 128.75
 See application file for complete search history.

(56) References Cited

U.S. PATENT DOCUMENTS

| | | | | |
|---|---|---|---|---|
| 6,099,206 A | * | 8/2000 | Pennell | 405/128.5 |
| 6,158,924 A | * | 12/2000 | Athens et al. | 405/128.25 |
| 6,261,029 B1 | * | 7/2001 | Miller | 405/263 |
| 6,913,419 B2 | | 7/2005 | Shiau | |
| 2002/0179530 A1 | * | 12/2002 | Cowdery et al. | 210/638 |
| 2003/0175081 A1 | * | 9/2003 | Shiau | 405/128.7 |
| 2005/0263454 A1 | * | 12/2005 | Sorenson, Jr. | 210/610 |

FOREIGN PATENT DOCUMENTS

WO  WO 2007/126779  11/2007

OTHER PUBLICATIONS

Abriola, et al., "Surfactant-Enhanced Solubilization of Residual Dodecane in Soil Columns. 2. Mathematical Modeling," Environmental Science & Tech., 27(12):2341-2351, 1993.

Abriola, et al., "Influence of Soil Texture on Rate-Limited Micellar Solubilization," Journal of Environmental Engineering, pp. 39-46, Jan. 2000.

Desphande, et al., "Dowfax Surfactant Components for Enhancing Contaminant Solubilization," Water Research, 34(3):1030-1036, 2000.

Dugan, "Coupling Surfactants/Cosolvents with Oxidants: Effect on Remediation and Performance Assessment," Ph.D. dissertation, Environmental Science and Engineering Division, Colorado School of Mines, Golden, Colorado, 336 pages, Apr. 18, 2008.

(Continued)

*Primary Examiner*—John Kreck
(74) *Attorney, Agent, or Firm*—Dorsey & Whitney LLP

(57) ABSTRACT

Compositions and methods are provided for oxidizing subsurface contaminants. Compositions include compatible combinations of surfactants, cosolvents and chemical oxidants. Compositions have been identified that provide compatible combinations of surfactants and chemical oxidants that maximize oxidant productivity on solubilized contaminants. The compositions and methods are especially effective on the treatment of dense non-aqueous phase liquids or DNAPLs.

12 Claims, 7 Drawing Sheets

OTHER PUBLICATIONS

Dwarakanath, et al., "Anionic surfactant remediation of soil columns contaminated by nonaqueous phase liquids," Journal of Contaminant Hydrology, 38:465-488, 1999.

Fountain, et al., "The use of surfactants for in situ extraction of organic pollutants from a contaminated aquifer," Journal of Hazardous Materials, 28:295-311, 1991.

Fountain, et al., "A Controlled Field Test of Surfactant-Enhanced Aquifer Remediation," Ground Water, 34(5):910-916, 1996.

Gates-Anderson, et al., "Comparison of potassium permanganate and hydrogen peroxide as chemical oxidants for organically contaminated soils," Journal of Environmental Engineering, 127(4):337-347, 2001.

Jerome, et al, "Final Report for Demonstration of In Situ Oxidation Destruction of DNAPL Using the Geo-Cleanse Technology," U.S. Department of Energy, Savannah River Site, Aiken, South Carolina, pp. 1-86, 1997.

Kavanaugh, et al., "The DNAPL Remediation Challenge: Is There a Case for Source Depletion?", EPA/68/C/02/092, U.S. Environmental Protection Agency, Cincinnati, Ohio, 129 pages, 2003.

Li, "Surfactant-enhanced oxidation of tricholorethylene by permanganate—proof of concept," Chemosphere, 54:419-423, 2004.

Lowe, et al., "Field Pilot Test In Situ Chemical Oxidation Through Recirculation Using Vertical Wells at the Portsmouth Gaseous Diffusion Plant," EPA/625/R-99/012, pp. 42-49, U.S. Environmental Protection Agency, Cincinnati, Ohio, 2000.

Lymen, et al., *Handbook of Chemical Property Estimation Methods—Environmental Behavior of Organic Compounds* (Table of Contents), American Chemical Society, Washington, D.C., 22 pages, 2nd printing, 1990.

Mackay, et al., "Groundwater contamination: Pump-and-treat remediation," Environmental Science & Technology, 23(6):630-636, 1989.

McKay, et al., "A Field Demonstration of Trichloroethylene Oxidation Using Potassium Permanganate," Chemical Oxidation and Reactive Barriers: Remediation of Chlorinated and Recalcitrant Compounds, Battelle Press, Columbus, Ohio, pp. 109-116, 2000.

Mott-Smith, et al., "In Situ Oxidation of DNAPL Using Permanganate: IDC Cape Canaveral Demonstration," Chemical Oxidation and Reactive Barriers: Remediation of Chlorinated and Recalcitrant Compounds, Battelle Press, Columbus, Ohio, pp. 125-134, 2000.

Palmer, et al., "Chemical Enhancements to Pump-and-treat Remediation," Ground Water Issue, EPA/540/S-92/OOI, U.S. Environmental Protection Agency, pp. 1-20, 1992.

Pennell, et al., "Surfactant-Enhanced Solubilization of Residual Dodecane in Soil Columns. 1. Experimental Investigation," Environmental Science & Technology, 27(12):2332-2340, 1993.

Rosen, *Surfactants and Interfacial Phenomena* (Table of Contents), John Wiley & Sons, Inc., Hoboken, New Jersey, 2004, 14 pages.

Rouse, et al., "Minimizing Surfactant Losses Using Twin-Head Anionic Surfactants in Subsurface Remediation," Environmental Science & Technology, 27(10):2072-2078.

Sabatini, et al., "Design of a Surfactant Remediation Field Demonstration Based on Laboratory and Modeling Studies," Ground Water, 35,(6): 954-963, 1997.

Sabatini, et al., "Membrane processes and surfactant-enhanced subsurface remediation: results of a field demonstration," Journal of Membrane Science, 151:89-100, 1998.

Sabatini, et al., "Integrated design of surfactant enhanced DNAPL remediation: efficient supersolubilization and gradient systems," Journal of Contaminant Hydrology, 45:99-121. 2000.

Shiau, et al., "Solubilization and Microemulsification of Chlorinated solvents Using Direct Food Additive (Edible) Surfactants," Ground Water, 32(4):561-569, 1994.

Schnarr, et al., "Laboratory and controlled field experiments using potassium permanganate to remediate trichloroethylene and perchloroethylene DNAPLs in porous media," Journal of Contaminant Hydrology, 29:205-224, 1998.

Seitz, Experimental evaluation of mass transfer and matrix interactions during in situ chemical oxidation relying on diffusive transport, M.S. thesis, Environmental Science and Engineering Division, Colorado School of Mines, Golden, Colorado, 125 pages, 2004.

Siegrist, et al., *Principles and Practices of In Situ Chemical Oxidation Using Permanganate* (Table of Contents), Batelle Press, Columbus, Ohio, 7 pages, 2001.

Struse, Mass transport of potassium permanganate in low permeability media and matrix interactions, M.S. thesis, Environmental Science and Engineering Division, Colorado School of Mines, Golden, Colorado, pp. 1-86, Apr. 9, 1999.

Struse, "Diffusive Transport of Permanganate During in Situ Oxidation," Journal of Environmental Engineering, pp. 327-334, Apr. 2002.

Urynowicz, Reaction kinetics and mass transfer during in situ chemical oxidation of dissolved and DNAPL trichloroethene with permanganate, Ph.D. dissertation, Environmental Science and Engineering Division, Colorado School of Mines, Golden, Colorado, 186 pages, 2000.

Van Cuyk, et al., "Hydraulic and purification behaviors and their interactions during wastewater treatment in soil infiltration systems," Water Research, 35(40:953-964), 2001.

Vella, et al., Oxidation of trichloroethylene: a comparison of potassium permanganate and Fenton's reagent, Eckenfelder, et al (editors), Third International Symposium for Chemical Oxidation: Technologies for the Nineties, Chemical Oxidation, Technomic Publishing, Lancaster, pp. 62-73, 1994.

West, et al., "A Full-Scale Demonstration of In Situ Chemical Oxidation Through Recirculation at the X-701B Site," ORNL/TM-13556, Oak Ridge National Lab, Oak Ridge, Tennessee, 114 pages, 1998.

Yan, et al., "Oxidative degradation and kinetics of chlorinated ethylenes by potassium permanganate," Journal of Contaminant Hydrology, 37:343-365, 1999.

* cited by examiner

METHOD AND COMPOSITIONS FOR TREATMENT OF SUBSURFACE CONTAMINANTS

This patent application claims benefit under 35 U.S.C. § 119(e) of U.S. Provisional Application Ser. No. 60/729,159 filed Oct. 21, 2005, which is incorporated herein by reference in its entirety.

STATEMENT REGARDING FEDERALLY SPONSORED RESEARCH

This invention was made with Government support under Contract No. CU-1290, entitled: "Reaction In Transport Processes Coordinating In Situ Chemical Oxidation Of DNAPLs". The Government has certain rights in the invention.

BACKGROUND OF THE INVENTION a. Field of the Invention

The invention generally relates to oxidative treatment of non-aqueous phase liquids (NAPLs) and more particularly to the oxidative treatment of dense non-aqueous phase liquids (DNAPLs) using a single composition having a combination of at least one surfactant and at least one oxidant.

b. Background Art

Dependence on surface and ground water supplies for potable water has increased as the population of the world, and corresponding industrialization of the world, has increased. Increased industrial use of water supplies has resulted in decreased water quality throughout the world, due principally to industrial related release of pollutants into water supplies. One particularly important class of industrial pollutants is dense non-aqueous phase liquids, or DNAPLs.

Conventional DNAPL remediation is focused on pump- and treat methods which have proven relatively ineffective. The aqueous solubility of DNAPL compounds is typically a few thousand parts per million (ppm) or less, inherently making water-based contaminant flushing highly inefficient. (Mackay and Cherry, Environmental Science & Tech. 23, no. 630-636 (1989)). Recently, and within the past decade, surfactant-enhanced aquifer remediation (SEAR) and in situ chemical oxidation (ISCO) have shown promise for remediation of DNAPL subsurface contamination. Numerous field applications of SEAR indicate that significant efforts have been directed at aggressive DNAPL remediation using in situ flushing reagents (Palmer and Fish, USEPA, EPA/540/S-92/001, p 20; Abriola et al., Environmental Science & Tech., 27:2341-2351 (1993); Shiau et al., Ground Water, 32, no 4: 561-569 (1994); Sabatini et al., Ground Water, 35, no 6:954-963 (1997); Sabatini et al., Journal of Membrane Science, 151, no. 1:89-100 (1998); Sabatini et al., Journal of Contaminant Hydrology, 45:99-121 (2000)) as well as ISCO (Jerome, EPA/542/N97/004 (1997); Schnarr et al., Journal of Contaminant Hydrology, 29: 205-224) (1998); West et al., Oak Ridge National Lab, Oak Ridge, Tenn., p 101 ORNL/TM-13556 (1998); Lowe et al., EPA/625/R-99/012 US EPA ORG, Washington, D.C., 42-49 (2000); McKay et al., Chemical Oxidation and Reactive Barriers: Remediation of Chlorinated and Recalcitrant Compounds, Battelle Press, Columbus Ohio, p 009-116 (2000); Mott-Smith et al., Chemical Oxidation and Reactive Barriers: Remediation of Chlorinated and Recalcitrant Compounds, Battelle Press, Columbus Ohio, p 125-134 (2000)). No one method, i.e., pump and treat, ISCO or SEAR, has proven totally satisfactory with regard to DNAPL removal and all have limitations with respect to performance and cost. (U.S. EPA, 2003, The DNAPL Remediation Challenge: Is There a Case for Source Depletion?, EPA 68-C-02-092, Office of Research and Development, Washington D.C. (2003)).

U.S. Pat. No. 6,913,419 to Shiau describes methods for sequentially treating a subsurface DNAPL containing site with low concentrations of surfactant followed by an abiotic polishing process. This combination of treatments is an improvement over existing DNAPL treatment processes (pump and treat alone, SEAR alone or ISCO alone), but still requires a two step process that can be costly and time consuming.

Against this backdrop the present invention has been developed.

BRIEF SUMMARY OF THE INVENTION

The present invention provides compositions and methods for the treatment or remediation of contaminated water supplies. In one aspect, the invention is directed to methods of oxidizing one or more subsurface contaminants. An effective amount of a solution comprising at least one surfactant and at least one chemical oxidant is provided. The solution is then introduced to the contaminant to solubilize and oxidize the subsurface contaminant. In certain embodiments, the contaminant is a non-aqueous phase liquid such as a DNAPL or LNAPL.

In certain variations, the surfactant is an anionic surfactant or a sulfonated surfactant (e.g sodium dioctyl sulfosuccinate). In certain variations, the chemical oxidant is potassium permanganate. In certain embodiments, less than 25% of the chemical oxidant oxidizes the surfactant in a 24 hour period. In certain aspects, the solution further includes a cosolvent or cosurfactant. In some variations, the co-surfactant can be a sulfonated co-surfactant.

The present invention also provides methods for storing compositions of the present invention as well as methods for treating a subsurface contamination with compositions of the present invention.

These and various other features and advantages of the invention will be apparent from a reading of the following detailed description and a review of the appended claims.

DETAILED DESCRIPTION OF THE INVENTION

Figure 1:
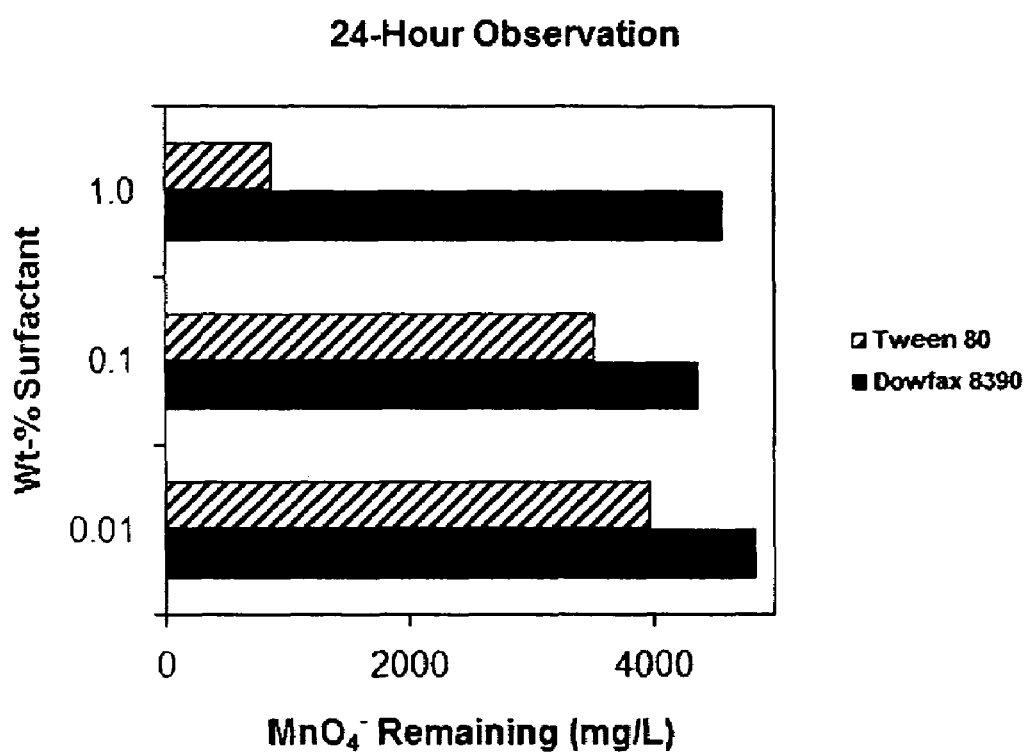
FIG. 1 illustrates permanganate compatibility as a function of surfactant concentration in accordance with one embodiment of the present invention.

The following description is directed at treatment or remediation of subsurface water using a single, combined composition having at least one surfactant and at least one oxidant. Note that the methods and compositions of the present invention could be used to treat any organic contaminant in a liquid or attached to soil. However, the invention is described in detail to address treatment of NAPLs, the same description of the methods and compositions would equally apply to treatment of other organic contaminants, the treatment of which are envisioned to be within the scope of the present invention.

In certain embodiments, contaminants can be alkenyl or alkynl compounds (i.e. compounds having at least one double bond between carbon atoms or triple bond between carbon atoms). The alkenyl or alkynyl contaminants can be substituted or unsubstituted. In certain embodiments, the contaminant is a NAPL, or a non-aqueous phase liquid. NAPLs include both DNAPLs and LNAPLs. As used herein, a "DNAPL" is an organic liquid that is denser than water (i.e. has a specific gravity greater than 1). An "LNAPL" is an organic liquid that is lighter than water (i.e. has a specific gravity less than 1).

NAPL contamination of water supplies has been prevalent since at least the early 20$^{th}$ century. It is well-documented that subsurface NAPL serves as a long-term source of contamination is long-term and often affects both the unsaturated and saturated "zones" at a pollution site. Illustrative DNAPLs include chlorinated solvents (for example, trichloroethene (TCE) and PCE, polyaromatic hydrocarbons (PAHs) (e.g., creosote and coal tar), and polychlorinated biphenyl oils (PCBs). These contaminants are termed nonaqueous in that they exist as a separate immiscible phase and as such do not dissolve completely in water.

DNAPL-contaminated sites pose unique site characterization and remediation challenges due several important physical properties of these compounds. First, because they are denser than water they can sink to great depths in the subsurface making them extremely difficult to locate. Secondly, many DNAPLs have low aqueous solubilities, but are still soluble in water. Exemplary solubilities of various DNAPLs are listed below in Table 1. The low aqueous solubilities of most DNAPL compounds are typically several orders of magnitude higher than health-based drinking water standards, therefore aqueous phase concentrations at receptor sites downstream from a DNAPL source are often several orders of magnitude above the maximum contaminant level (MCL) (Table 1).

TABLE 1

Water Solubility of Common Organic Chemicals at 25° C.

| Chemical | Solubility in water$^a$ (mg/L) | $^b$MCL (mg/L) |
|---|---|---|
| Benzene | 1780 | 0.005 |
| Trichloroethene | 1100 | 0.005 |
| Toluene | 515 | 1.0 |
| Chlorobenzene | 472 | 0.1 |
| p-Xylene | 210 | 10 |
| Tetrachloroethene | 200 | 0.005 |
| o-Xylene | 175 | 10 |
| Ethylbenzene | 152 | 0.7 |
| Napthalene (PAH) | 33 | 0.0002 |
| Lindane (herbicide) | 7.3 | 0.0002 |
| Phenanthrene (PAH) | 6.2 | 0.0002 |
| n-Octane | 0.72 | NA |
| n-Decane | 0.053 | NA |
| Aroclor 1260 (PCB) | $2.7 \times 10^{-3}$ | 0.0005 |

TABLE 1-continued

Water Solubility of Common Organic Chemicals at 25° C.

| Chemical | Solubility in water$^a$ (mg/L) | $^b$MCL (mg/L) |
|---|---|---|
| Benz[a]anthracene (PAH) | $2.5 \times 10^{-4}$ | 0.0002 |
| Benzo(a)pyrene (PAH) | $4.9 \times 10^{-5}$ | 0.0002 |
| Dioxin (2,3,7,8-TCDD) | $1.9 \times 10^{-9}$ | $3.0 \times 10^{-8}$ |

$^a$Values from Lymen, W. J., Reehl, W. F., and Rosenblatt, D. H. (1990). Handbook of Chemical Property Estimation Methods, 2$^{nd}$ printing. American Chemical Society (ACS). Washington, D.C.,
$^b$United States Environmental Protection Agency (USEPA) http://www.epa.gov/safewater/mcl.html The combined result of DNAPL solubility, or lack thereof, as well as risk-based standards for ground water quality that are typically several orders of magnitude lower than the aqueous solubilities, makes remediation of this class of pollutants particularly difficult to address. At sites where DNAPL is present, separate or sorbed phases continue to release dissolved contaminants to the surrounding groundwater generating large dissolved phase plumes that serve as sources of subsurface contamination for very long periods of time (e.g., decades). In addition, TCE and PCE are relatively volatile in pure phase and as a result can partition into soil gas with subsequent migration of vapors into the vadose zone posing an inhalation risk to above-ground receptors.

Embodiments of the present invention provide compositions having at least one surfactant combined with at least one oxidant for use in the treatment of DNAPL. The present invention provides compositions comprising surfactants and oxidants that both maximize oxidative treatment of the DNAPL, and minimize detrimental effects of oxidative reactions on the DNAPLs, for example accumulation of reaction products that result in aquifer plugging or isolation of the untreated DNAPL. The invention provides effective surfactant and oxidant combinations that show compatibility in that the combinations provide for the solubility of the DNAPLs and provide an environment for highly productive and long lasting oxidation of the DNAPLs. In addition, maximization of an oxidants capacity to destroy DNAPLs enhances the cost effectiveness and timeliness of the treatment as compared to using each constituent separately. Note, for example, that ineffective oxidation of contaminants results in increased oxidant consumption with resulting increases in cost and detrimental effects.

Embodiments of the present invention also include compositions having at least one surfactant, at least one cosolvent and at least one oxidant, again predicated on providing highly productive environments for oxidation of subsurface DNAPLs, while minimizing the negative effects of DNAPL precipitation. Importantly, identification of compatible cosolvents for use with the compositions of the present invention provides additional solubility and stability of surfactant-DNAPL microemulsions. In general, cosolvents of the present invention facilitate the alteration of the organic-water interface by increasing aqueous DNAPL solubility and lowering of the DNAPL-water interfacial tension.

Embodiments of the present invention also provide treatment methods for subsurface groundwater contamination using the above described compositions. Methods include application of a single composition into pre-determined sites via a forced gradient flush or via a probe injection. The compositions of the present invention can be prepared just prior to use (store each material separately and combine just prior to use) or can be stored as a single solution (surfactant, oxidant and cosolvent pre-mixed and stored for use).

Surfactants for Use with the Present Invention:

Surfactants are surface-active agents that alter the organic-water interface. In general, surfactants are amphilic compounds possessing both hydrophobic (non-polar) and hydrophilic (polar) functional groups. The hydrophilic "head" often includes an anion or cation, for example, sodium or chloride. The hydrophobic "tail" is composed of a long hydrocarbon chain. When surfactant concentrations exceed the critical micelle concentration (CMC), the surfactant molecules (monomers) self-aggregate into spherical structures known as micelles. Typical micelles contain fifty to one hundred surfactant monomers. Below the CMC, a minimal effect occurs on the organic-water interface. As such, embodiments of the present invention provide surfactants to a NAPL contamination site at a concentration above the CMC for the contamination site.

In a micellar structure, the hydrophobic tails cluster together forming a non-polar cavity, while the hydrophobic heads remain in the water. The polar exteriors make micelles highly soluble in water, while the non-polar interior provides a hydrophobic sink for organic compounds, thereby increasing the apparent solubility of the organic contaminants.

TABLE 2

| PCE in water only (mg/L) | 5% SDS + 3% AOT: PCE (mg/L) | 5% SDS + 3% AOT + 3% NaBr: PCE (mg/L) | 5% Dowfax + 3% AOT: PCE (mg/L) | 5% Dowfax + 3% AOT + 3% NaBr: PCE (mg/L) |
|---|---|---|---|---|
| 200 | 21,410 | 62,700 | 31,954 | 107,284 |

Table 2 shows the solubility of PCE in different surfactants, co-surfactants and electrolytes as compared to the solubility of PCE in water alone. Co-surfactants and electrolytes serve to further enhance the solubilization capacity of any given surfactant. Table 2 shows an increase in solubility for specific surfactants, particularly when sulfonated surfactants and sulfonated co-surfactants are used.

Figure 4:
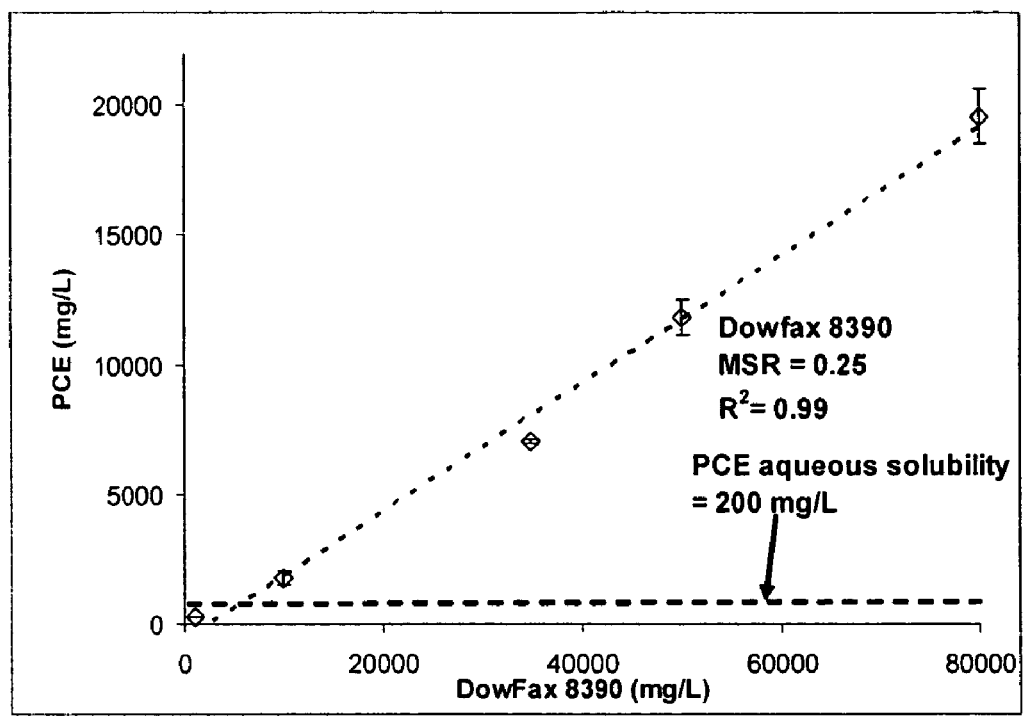
FIG. 4 illustrates the increase in tetracholorethene (PCE), solubility as a function of surfactant concentration with Dowfax 8390 as the example. The molar solubilization ratio (MSR) is shown as moles of PCE solubilized/mole of surfactant.

FIG. 4 illustrates the increase in PCE solubility as a function of surfactant concentration (e.g. Dowfax 8390). The molar solubilization ratio (MSR, or moles of PCE solubilized/mole of surfactant) was higher for each of three surfactants: SDS, Dowfax 8390, and sodium dioctyl sulfosuccinate (AOT). All three surfactants were compatible with permanganate. Electrolytes (e.g., NaBr) are used further enhance their organic contaminant solubilization potential of surfactants.

Surfactant treatment of NAPLs promotes solubilization and/or mobilization by incorporating NAPL molecules into micellar structures in the aqueous phase, or by reducing the interfacial tension (IFT) between the NAPL and the aqueous phase (see Fountain et al., Journal of Hazardous Materials, 28:295-311 (1991); Fountain et al., Ground Water, 34(5): 910-916 (1996)). In some instances, cosolvents or salinity modifications are required to bring about an acceptable lowering of the IFT between a target NAPL and aqueous phase. Surfactant phase behavior studies have been conducted to identify adverse phase behavior such as gel formation or crystalline precipitation that results in pore plugging (see Dwarakanath et al., Journal of Contaminant Hydrology, 38: 465-488 (1999)). Surfactant phase behavior is commonly represented by volumetric fraction and ternary diagrams. When NAPL constituents are solubilized at the center of a micelle, a transparent solution termed a Winsor type I system is formed. The increase in apparent aqueous solubility of organic compounds at supra-CMC surfactant concentrations is referred to as micellar solubilization; where as the surfactant concentration increases, additional micelles are formed with resulting increases in contaminant solubility.

In certain embodiments, the surfactants are sulfonated surfactants. As used herein, a "sulfonated surfactant" is a surfactant that has a sulfonic acid group as part of part of the hydrophilic group on the surfactant. "Sulfonated surfactants" include both the solution form ($SO_3^-$ containing surfactants), and the salt form. Rosen, M. J. *Surfactants and Interfacial Phenomena*. 3$^{rd}$ (Ed.), John Wiley & Sons, Inc. N.J. 444.pp. Exemplary sulfonated surfactants include Arylalkanesulfonates, Sulfosuccinate esters (e.g., AOT), and Alkydiphenylether(di)sulfonates (e.g., Dowfax 8390).

Co-surfactants can also be used with the present invention. A co-surfactant is a second surfactant different from the first surfactant. In various embodiments, surfactant-enhanced organic contaminant solubilization of contaminants can be increased to above what a single surfactant can accomplish. In various embodiments, one or both of the surfactant and co-surfactant can be a sulfonated surfactant, as described herein.

Cosolvents are water-miscible alcohols (e.g., tert-butanol, methanol, isopropanol, and the like) that can be combined with a surfactant flush to enhance surfactant performance. The combination of a cosolvent with a surfactant produces stable micro emulsions (i.e., formation of Windsor Type III micro emulsions in combination with lower IFT). Cosolvents are similar to surfactants in that they can alter the properties of organic-water interfaces bringing about both an increase in aqueous DNAPL solubility and lowering of DNAPL-water IFT.

One embodiment of the present invention provides surfactants compatible with various oxidants for use in remediation of subsurface DNAPL. Surfactants of the present invention are capable of increasing DNAPL solubility, lowering DNAPL-IFT, facilitating oxidant activity, and minimizing precipitation that results from oxidation of DNAPL. Surfactants for use in the present invention were determined through compatibility testing with target oxidants (see Examples 1 and 2). Parameters that were evaluated included productivity of oxidant consumption and production of precipitates from the oxidation reaction.

Typical surfactants of the present invention can be either ionic or anionic. In general, surfactants that provide acceptable results in the context of the present invention are anionic, and preferably have a strong anionic charge. More typically, surfactants for use with the present invention are surfactants that include at least one sulfonated anionic group, and in some cases, at least two sulfonated anionic groups. Illustrative surfactants for use in the present invention include, but are not limited to, sodium hexadecyl diphenyl oxide disulfonate (DOWFAX® 8390, Dow Chemical Company, see technical bulletin "Dowfax anionic surfactants for high performance products) and hexadecyl-diphenyl oxide mono-sulfonate (Aerosol-OT). In general, compatible surfactants of the present invention, i.e., compatible with oxidants of the invention, are present from about 0.1 wt % to about 10 wt % of an overall composition weight.

One exemplary surfactant for use with oxidants in the present invention is Aerosol-OT. As such, Aerosol-OT provides a surfactant that is highly resistant to oxidation and yet provides an excellent environment for solubilization of the DNAPL. Performance compatibility was determined via experimentation, as shown in Examples 1 and 2.

In alternative embodiments, surfactants of the present invention are combined with cosolvents. Cosolvents have been found to enhance the performance capabilities of the surfactants and can be combined at an about 2 wt % to about 5 wt % of the overall composition weight. Typical cosolvents for use with the present invention are water-miscible alcohols. In preferred embodiments, the cosolvent is a tertiary alcohol (note that tertiary alcohols lack a hydrogen atom attached to carbinol carbon for the oxygen to removed when in the presence of an oxidant). Illustrative cosolvents for use with the present invention include: tert-butanol, methanol, isopropanol, and the like, and in many embodiments the cosolvent is tert-butanol.

Oxidants for Use with the Present Invention:

In situ chemical oxidation (ISCO) is another remediation technology for treating NAPL. In ISCO, chemical oxidants are delivered into the subsurface to rapidly degrade organic COCs in both the soil and ground water. Oxidants that have been utilized for environmental treatment include: potassium and sodium permanganate ($KMnO_4$, $NaMnO_4$), sodium persulfate ($Na_2S_2O_8$), catalyzed hydrogen peroxide (CHP), and ozone. In general, oxidants of the present invention add oxygen, remove hydrogen and/or remove electrons from an element or compound, such as an organic contaminant. In general ISCO systems are capable of achieving relatively high treatment efficiencies (e.g., >90%) for contaminants of concerns (COC) for most notably for chlorinated ethenes (i.e., alkenes) (e.g., TCE, PCE, dicholorethene, (DCE), vinyl chloride (VC)). However, permanganate (under normal subsurface conditions) has been shown to be relatively ineffective for the oxidation of chlorinated ethanes (i.e., alkanes) (e.g., 1,1,1-trichloroethane (1,1,1-TCA), (Gates-Anderson, D. D., Siegrist, R. L., and Cline, (2001). "Comparison of potassium permanganate and hydrogen peroxide as chemical oxidants for organically contaminated soils." *J. Environ. Eng.*, 127(4), 338-347). Experimental evidence does suggest that there are other organic COCs that can be degraded by permanganate for example, some aromatic compounds BTEX (LNAPLs) (i.e., benzene, toluene, ethyl benzene, and xylene), phenols, polyaromatic compounds (e.g., naphthalene, phenanthrene, and pyrene), polychlorinated biphynyls (e.g., 4-chlorobiphenyl (4-CB), and 2,5,2-trichlorobiphenyl (2,5,2-TCB) Siegrist, R. L., Urynowicz, M. A., West, O. A., Crimi, M. L., and Lowe, K. S. (2001). *Principles and practices of in situ chemical oxidation using permanganate*, Batelle Press, Columbus, Ohio.

For use in the present invention, i.e., compatibility with surfactant and cosolvents in the oxidation of DNAPL, permanganate ($MnO_4$—) has several desirable properties, including: high oxidizing potential ($E_0$=1.7V), effective over wide pH range (3.5-12), relatively stable, low cost (0.15$/lb), with moderate to high reaction rates (see Siegrist et al., Principles and Practices of In Situ Chemical Oxidation Using Permanganate; Batelle Press: Columbus, pp. 348. (2001)). Each of these parameters provides a benefit for use in a single treatment composition as used in the present invention. Permanganate is an oxidizing agent with a unique affinity for organic compounds containing carbon-carbon double bonds, aldehyde groups, or hydroxyl groups. Under normal subsurface pH and temperature conditions, the primary oxidation reaction for PCE involves spontaneous cleavage of the carbon-carbon bond and direct electron transfer, although the process is relevant for any chlorinated ethene. PCE is the contaminant used in this study and therefore will be the focus of the kinetics discussion. The stoichiometry for the complete destruction of PCE by $KMnO_4$ is given by the reaction:

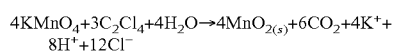

(1)

Hydroxylation of olefins (e.g., PCE) by $MnO_4^-$ has been well established so that under neutral to acidic pH values $MnO_4^-$ reacts initially with the carbon-carbon double bond resulting in the formation of an intermediate hypomanganate ester. Recent studies have indicated that this ester can then undergo further decomposition to form carbon dioxide, as well as several carboxylic acids including formic, oxalic, glyoxylic, and glycolic acids (Yan, Y. E., and Schwartz, F. W. (1999). "Oxidative degradation and kinetics of chlorinated ethylenes by potassium permanganate." *J. Contam. Hydrol.*, (37), 343-365).

The degradation of five chlorinated ethenes (TCE, PCE, and 3 isomers of DCE) has been investigated through kinetic experiments using 1 mM permanganate and can be simply characterized by a pseudo-first-order model (Yan, Y. E., and Schwartz, F. W. (1999). "Oxidative degradation and kinetics of chlorinated ethylenes by potassium permanganate." *J. Contam. Hydrol*, (37), 343-365). The pseudo-first-order rate constants ranged from 0.45 to 300=$10^{-4}s^{-1}$. The degradation was rapid for most of compounds (i.e., TCE and DCE isomers) with half lives generally less than 20 min, with PCE having a longer half-life of 257 min or about 4 h.

When an oxidant is used alone, there is the potential for generation of reaction precipitates, e.g., manganese dioxide solids, carbon dioxide gas (limits ISCO efficiency) and overall oxidation reaction productivity is reduced as compared to combination with a surfactant of the present invention. Importantly, the inventors are not aware of any remediation compositions that use a single composition having a combined surfactant and oxidant for the treatment of DNAPLs. As is shown herein and in the Examples, typical combinations of a surfactant with an oxidant result in rapid oxidation of the surfactant and consumption of the oxidant (as well as detrimental byproduct formation).

Embodiments of the present invention provide oxidants for use with the surfactant and surfactant/cosolvent combinations discussed above. As noted above, oxidants for use with the present invention are highly productive and produce minimal amounts of precipitate when used in combination of the surfactants and cosolvents of the present invention. Oxidants for use with the invention include, but are not limited to: potassium or sodium permanganate, sodium persulfate, catalyzed hydrogen peroxide (CHP), ozone and the like. In preferred embodiments, potassium or sodium permanganate are combined with the surfactants and cosolvents of the invention. Note that in some embodiments of the present invention, combinations of different oxidants can be used that are compatible with surfactant solutions. For example, CHP or persulfate and an anionic surfactant may be combined as long as they maintain compatibility and are useful in the context of the present invention.

TABLE 3

| Remedial Technology | Location, Date, Flushing Agent | Pilot/Full-Scale or Lab Study; Media | COC | Performance Results |
|---|---|---|---|---|
| SEAR | Hill AFB OU2[a], Ogden, UT; 8-wt % AMA-80I + 4%-wt % Isopropanol + 0.12-wt % NaCl | Pilot/ground water | PCE | 98% reduction |
| | Bachman Road Site[b]; Oscada, MI; 6-wt % Tween 80 | Full/ground water | PCE | Aqueous VOC 4000 μg/L → 650 μg/L |

TABLE 3-continued

| Remedial Technology | Location, Date, Flushing Agent | Pilot/ Full-Scale or Lab Study; Media | COC | Performance Results |
|---|---|---|---|---|
| | Alameda Naval Air Station[a], Alameda, CA; 2-wt % AMA-80I + 5-wt % Dowfax 8390 + 3-wt % NaCl | Pilot/ ground water | Solvent Mixture | 97% reduction |
| ISCO | LC 34 Cape Canaveral[b], FL; 0.1-3.0% KMnO$_4$ | Pilot/ ground water/ soil | TCE | Ground water 1,100 mg/L → 89-95% reduction Soil 82% ↓ |
| | Portsmouth Gaseous Diffusion Plant[b], Piketon, OH 1.5-2.5% KMnO$_4$ | Full/ ground water | TCE | 8000 mg/L → below detection 54-302 mg/kg → below detection |
| | Canadian Forces Base Borden[c], Ontario, CN 1996; 8 g/L KMnO$_4$ | Pilot/ ground water | TCE PCE | 1200 mg/kg → 99% reduction 6700 mg/kg → 99% reduction |
| Sequential Application | SEAR + KMnO$_4$[e] | Lab with site ground water and soil | TCE | 99.6% reduction |

[a]ITRC (2003);
[b]GeoSyntec Consultants (2004);
[c]USEPA (1998);
[d]Xie and Barcelona (2003),
[e]Shiau, B-J. (2003)[e]

Table 2 depicts the removal of DNAPLs using the surfactant based method SEAR, the oxidant based method ISCO, and a sequential application of the two in a laboratory setting. The resulting mass reduction, while significant on a percentage basis, does not meet regulatory based water quality standards (maximum contaminant levels (MCLs)). Combining the surfactants and oxidants as a co-injection, as described herein, however, provides significantly improved water remediation resulting from solubilization and oxidation of contaminants by a single solution.

Oxidants of the present invention are combined with the surfactant/cosolvent or surfactant alone at an about 0.1 to about 10 wt % of the weight of the composition. Generally, the amount of oxidant used in compositions of the present invention is dependent on the site conditions and remediation goals. Note that other amounts of oxidant can be used in the context of the present invention as long as the oxidant concentration is compatible with the surfactants and cosolvents of the invention.

In general, the oxidants of the present invention are added to the surfactant just prior to contact with the DNAPL, although it is envisioned that permanganate can be combined with surfactants of the invention before use on DNAPLs (see below).

Table 3 provides a series of illustrative combination of surfactants, cosolvents and oxidants in accordance with embodiments of the present invention. Note that combinations include: sodium hexadecyl diphenyl oxide disulfonate or monosulfonate, potassium permanganate and tert-butanol (surfactant, oxidant and cosolvent) or hexadecyl diphenyl oxide disulfonate or monosulfonate and potassium permanganate (surfactant and oxidant). Also note that more than one surfactant can be combined with one or more oxidants as long as the composition constituents are compatible.

TABLE 4

| | Oxidant, Surfactants and Cosolvent | | | |
|---|---|---|---|---|
| Compound | Type | Trade Name | Formula | Composition Concentration Range |
| Potassium Permanganate | Oxidant | NA | KMnO$_4$ | 0.1-10 wt % |
| Sodium dioctyl sulfosuccinate | Surfactant | Aerosol OT-100 | $C_{20}H_{37}O_7NaS$ | 0.1-3 wt % |
| Sodium hexadecyl diphenyl oxide disulfonate (C16 linear) | Surfactant | Dowfax 8390 | $C_{16}H_{33}C_{12}H_7O(SO_3Na)_2$ | 0.5-10 wt % |
| Sodium diphenyl oxide sulfonate | Surfactant | Calfax 16L-35 | $C_{12}H_7OSO_3Na$ | 0.1-10 wt % |
| Sodium dodecyl sulfonate | Surfactant | SDS | $CH_3(CH_2)_{11}SO_3Na$ | 0.1-10 wt % |
| Tert-butanol | Cosolvent | NA | $(CH_3)_3COH$ | 2-5 wt % |

Methods for Treating Subsurface DNAPL

The present invention provides methods for the contemporaneous coupling of a compatible surfactant (and/or cosolvent) and oxidant. In previous studies SEAR has been implemented for remediation of sites with pooled or high levels of residual saturation NAPL (SN) whereas ISCO has been utilized most frequently at sites where dissolved phase or low levels of DNAPL saturation are present. Studies to date have involved MnO$_4$— oxidation of chlorinated ethenes that revolve around chemical oxidation of the dissolved phase of these organic compounds (see for example, Vella, P. A., and B. Veronda. Oxidation of trichloroethylene: a comparison of potassium permanganate and Fenton's reagent. In: Eckenfelder, W. W., Bowers, A. R., Roth, J. A. Eds., Third International Symposium for Chemical Oxidation: Technologies for the Nineties. Chemical Oxidation. Technomic Publishing, Lancaster, pp. 62-73. (1994); Yan, Y. E., and F. W. Schwartz. Journal of Contaminant Hydrology 37: 343-365 (1999)). In addition, studies have focused on oxidation of sorbed and NAPL-phase chlorinated ethenes (Urynowicz, M. A. Reaction kinetics and mass transfer during in situ chemical oxidation of dissolved and DNAPL trichloroethene with permanganate. Ph.D. dissertation, Environmental Science & Engineering Division, Colorado School of Mines, Golden, Colo. (2000)). Experimental evidence suggests increased rates of DNAPL degradation are the result of chemical reactions that produce an overall increase in the rate of dissolution arising from the increased concentration gradient between aqueous phase oxidant and DNAPL (see Urynowicz, M. A. Reaction kinetics and mass transfer during in situ chemical oxidation of dissolved and DNAPL trichloroethene with permanganate. Ph.D. dissertation, Environmental Science & Engineering Division, Colorado School of Mines, Golden, Colo. (2000).

Embodiments of the present invention include either storing the surfactant solution and oxidant agent in the same container, for example in a single baker tank, or in separate containers, for example in side-by-side baker tanks.

Where the surfactant and oxidant are stored in the same tank, the composition can be mixed just prior to use in a DNAPL treatment. Where the surfactant is stored separately from the oxidant, the two solutions are brought together in a third container for mixing and injection via one of the two delivery methods discussed below. Note that where a cosolvent is used, a third tank can be included or, where the composition is stored as a mixed solution, included with the surfactant and oxidant in a single container or tank.

Embodiments of the present invention include applying the compositions of the present invention via a forced gradient flush or a probe injection. A forced gradient flush is preferred when the contaminants are present in a substantially uniform field site having sorbed and dissolved phase DNAPL. (see for example Siegrist et al., 2001). The flushing involves inducing a hydraulic gradient via injection and extraction wells. The flushing itself can be performed either vertically or horizontally in the subsurface. Typical forced gradient flush rates with the compositions of the present invention (usually via co-injection of surfactant and oxidant or surfactant/cosolvent and oxidant) can be provided at approximately 4× the groundwater flow.

A probe injection is preferred when the compositions of the present invention are provided to a more heterogeneous or low permeability environment (Siegrist, (1999)). The probe injection involves the delivery of compositions of the present invention in smaller areas, as a probe is driven systematically into the subsurface. Applications of the compositions of the present invention to low permeable media allow the oxidant access to the target contaminants more readily than uncontaminated zones. Probe injection is useful where the compositions of the present invention can be directly provided (or in close proximity) to subsurface zone of interest.

Having generally described the invention, the same will be more readily understood by reference to the following examples, which are provided by way of illustration and are not intended as limiting.

EXAMPLES

The following examples are included to illustrate aspects of the methods and compositions disclosed herein. The methods and compositions described herein are not limited to the specific disclosed embodiments.

In the embodiments described below, a single flushing solution containing a surfactant, and an oxidant to yield a mass depletion and resulting reduction in the mass flux from the NAPL source. The surfactant enhances NAPL solubilization, while the oxidant causes NAPL mass destruction.

To demonstrate the potential of this remediation technique, batch-screening tests were conducted with 72 surfactants and 7 cosolvents in the presence of the oxidant $KMnO_4$ to identify the optimal surfactant/cosolvent for coupling with $KMnO_4$. The following experiments demonstrate how to optimize surfactants and oxidants. While the experiments are directed to DNAPLs, it is contemplated that the methods can be used on other organic contaminants discussed herein, including NAPLs (e.g. LNAPLs).

Materials used in the examples include: analytical grade tetrachloroethene (PCE) (>99% purity) as purchased from Aldrich Chemical and technical-grade $KMnO_4$, as purchased from Carus Chemical Company Inc.

PCE was used as the contaminant in the following Examples as it is one of the most ubiquitous organic immiscible-liquid contaminants in the subsurface (see US EPA, 2003, The DNAPL Remediation Challenge: Is There a Case for Source Depletion?, EPA 68-C-02-092 (Office of Research and Development, Washington, D.C.)). The capacity of a composition of the present invention to oxidize and treat a PCE containing material provides a strong correlation to the capacity to oxidize and treat other DNAPL containing materials.

Methods used in Example 1 and 2 are described below prior to a discussion of each Example.

PCE Solubilization:

The apparent solubility of PCE in DOWFAX 8390 was determined by batch experiments. Although equilibrium measurements of this type are a necessary step in surfactant screening, previous researchers have suggested that substantial solubilization rate limitations may occur in situ (Pennell et al., Environmental Science & Technology, 27 no. 12:2332-2340 (1993); Abriola et al., Environmental Science & Technology 27, 2341-2351 (1993); Abriola et al., Jr. of Environmental Engineering X, 1111-1611 (1999)). Therefore use of equilibrium values in the prediction of surfactant enhanced remediation performance may result in the underestimation of remediation times and costs.

PCE concentrations were determined using a Hewlett-Packard gas chromatograph (GC) equipped with auto-ampler and electron capture detector (ECD).

Surfactant Sorption:

Adsorption isotherms of ionic surfactants onto charged sites are typically approximated using a Langmuir model (Rosen, 1989). An assumption was made that adsorption of surfactant on the #140 negative-charged clean silica sand is negligible since the doubly negative charged Dowfax 8390 would not be attracted to the negative-charged clean sand. The medium-grained laboratory sand contained metal oxides, which provide positive charge sites for ion exchange of negative charged surfactants, therefore batch sorption experiments were conducted with Dowfax 8390; however, sorption was found to negligible with the laboratory sand.

Interfacial Tension and Density:

The interfacial tension between PCE and Dowfax 8390 was determined using a DuNuoy ring tensiometer (Fisher Scientific Surface Tensiomax 21). The 3.5 wt % Dowfax 8390 solution was equilibrated with the PCE prior to the interfacial tension measurements. The density of the 3.5 wt % solution of Dowfax 8390 was measured by determining the mass of a 5 ml sample at 23° C. The reported interfacial tension and density values are the average of five individual measurements (see Table 4). The physical and chemical properties of Dowfax 8390, potassium permanganate, and PCE are also provided in Table 4.

TABLE 5

Chemical and Physical Properties of Dowfax 8390 and Potassium Permanganate

| Property | Surfactant[a] | Oxidant[b] | PCE |
|---|---|---|---|
| Chemical name | Sodium hexadecyl diphenyl oxide disulfonate | Potassium Permanganate | Tetra-choloro-ethene |
| Trade Name | Dowfax 8390 | NA | NA |
| Formula | $C_{16}H_{33}C_{12}H_7O(SO_3Na)_2$ | $KMnO_4$ | $C_2Cl_4$ |
| Molecular Weight (g/mol) | 642 | 158 | 163 |
| Hydrophilic head group | Anionic | NA | NA |
| Purity (wt-%) | 35% | Technical grade-98% | >99% |
| Form | Yellow liquid | Purple crystalline Solid | Clear liquid |
| Solubility in water 20° C. (mg/L) | miscible | 65,000 | 250[c] |
| Toxicity/EPA Approved | Food-Grade | | |

TABLE 5-continued

Chemical and Physical Properties of Dowfax 8390 and Potassium Permanganate

| Property | Surfactant[a] | Oxidant[b] | PCE |
|---|---|---|---|
| CMC (mg/L) | 140 | NA | NA |
| HLB | 78.6 | NA | NA |
| Density (g/cm$^3$) | 1.007[c] | NA | NA |
| Interfacial Tension (dyne/cm) | 8.5[c] | NA | X |

CMC: critical micelle concentration,
HLB: hydrophobic-lipophilic balance,
NA: not applicable
[a]DOW Chemical Co.,
[b]Carus Chemical Co.,
[c]Measured for this study Example 1

Screening for Compatibility of Surfactants with Oxidants

The following Example is provided to determine which, if any, surfactants can be combined with an oxidant to oxidize a PCE DNAPL solution. The combinations presented in the following Example are not exclusive but show a correlation between the use of certain classes of surfactants and certain types of oxidants.

Seventy two surfactants were tested alone or in the presence of cosolvents to determine compatibility with $KMnO_4$. Concentrations for each constituent corresponded to one of two remediation scenarios: (1) a relatively high wt-% of surfactants, i.e., 1-10 wt-%, is coupled with oxidants representative of conditions where a surfactant flush is conducted and followed by one or more water flushes, with high levels of surfactant remaining when the oxidant is introduced (note that this scenario could also represent co-injection of surfactant and oxidant); and (2) a relatively low wt-% of surfactant, i.e., 0.01-0.1 wt-%, is coupled with oxidants representative of conditions where a surfactant flush is conducted by water flush with low levels of surfactant remaining when the oxidant is introduced.

The two cases are representative of the range of possible concentrations that may be encountered during pre- and post-remedial agent flushing scenarios. Concentrations of KMnO4 that have been used at ISCO filed sites range from about 100 mg/L to about 40,000 mg/L depending on the site conditions and COC (see for example, Hood et al., 2001; Siegrist et al., 2001). Potassium permanganate concentrations of 500 mg/L to 5,000 mg/L were used in the screening tests, these concentrations being representative for both laboratory conditions and field applications. Follow-up experiments were conducted with several of the surfactants found to be most compatible for coupling with solutions of 40,000 mg/L $KMnO_4$.

Solutions containing surfactant alone, cosolvent alone, or mixtures of surfactant and cosolvent were used in the batch screening studies. Qualitative and quantitative criteria were used to define a compatible coupling. For example, a bright purple color provides a visual qualitative assessment regarding oxidant consumption, therefore solutions that remained bright purple with relatively few manganese dioxide solids generated throughout the 24-hour reaction period were deemed compatible. In addition, a quantitative measure of amount of oxidant consumed after coupling was used where the model surfactant or surfactant/cosolvent pairing did not exert extensive demand for the oxidant with no more than 25% of the oxidant consumed throughout the 24-hour reaction/observation period.

In that most SEAR or ISCO field applications would likely not be concluded after 24-hours further studies were conducted with a select group of 25 surfactants (both nonionic and anionic) and all 7 cosolvents prepared in duplicate to measure $MnO_4^-$ depletion and $MnO_{2(s)}$ formation at sampling time points of 3-, 24-, 120-, and 336-hours.

The batch screening samples were prepared in 40 ml type A borosilicate glass vials with Teflon®-lined septa. The desired surfactant concentration (corrected for active weight percent) was weighed and dispensed into each sample vial. Thirty milliliters of a 5,000 mg/L $KMnO_4$ solution prepared with de-ionized water was dispensed into each vial. If cosolvent was present, the desired weight percent was added to the vial on a vol/vol basis. The total sample volume was 30-ml, leaving 10-ml of headspace in the event of gas or foam generation. The vials were shaken until the solutions were well mixed.

Visual observation on each vial was made at three, twenty-four and forty-eight hours. The amount of oxidant remaining in the surfactant, or surfactant/cosolvent, solution was determined with a Hach DR/4000 Ultraviolet Spectrophotometer (UV Spec.). A 0.1 ml aliquot of sample was filtered with a 10-micron filter and dispensed into a 10-ml vial, followed by addition of 9.9 mLs of de-ionized water. The resultant solution has a permanganate dilution of less than 50 mg/L (ideal absorbance measurement range). Samples were analyzed at 525 nm for $KMnO_4$ with final concentrations derived from a 6-point standard calibration curve. Results:

The surfactant/cosolvent screening tests with 500 mg/L $KMnO_4$ resulted in a rapid color change of the solution from purple to clear (indicating significant demand for the oxidant) with very few $MnO_2$ solids generated for all 72 of the surfactants examined, either with or without cosolvent present. Tests conducted with 5,000 mg/L $KMnO_4$ for many of the surfactants/cosolvents at 3.5-to-10 wt % had unfavorable results, in that there was excessive oxidant demand with significant generation of $MnO_2$ solids.

Figure 5:
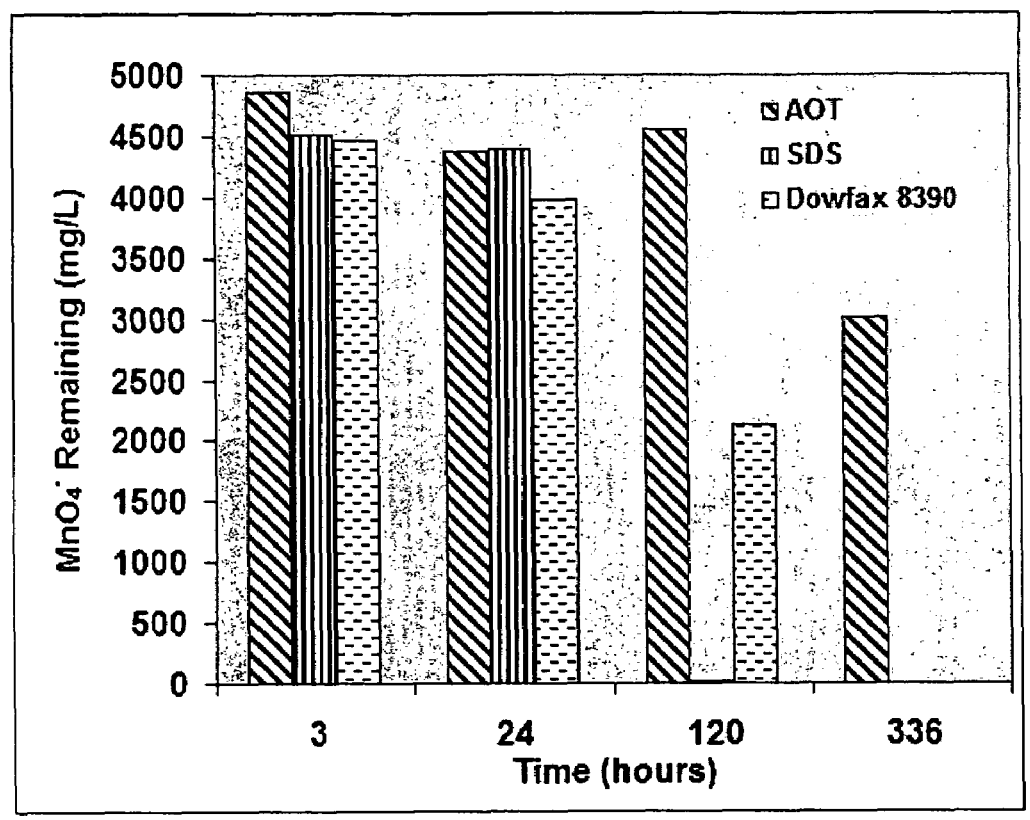
FIG. 5 illustrates the $MnO_4^-$ remaining at sampling time points of 3-, 24-, 120-, and 336-hours after coupling permanganate with surfactants.

Batch experiments conducted using residual surfactant concentrations of 0.1% wt % or 0.01 wt % and 5,000 mg/L of potassium permanganate provided favorable results for nearly 25% of the surfactants. The following four surfactants and one cosolvent were found to be very compatible at both residual and higher surfactant concentrations, e.g., 0.01-10 wt %, with 5,000 mg/L potassium permanganate: sodium dioctyl sulfocuccinate (Aerosol-OT, Cytec. Chem. Co.) disodium hexadecyl diphenyl oxide disulfonate (DOWFAX 8390, Dow Chemical Co.), sodium dodecyl sulfate (SDS, Sigma Aldrich), C16 linear sodium diphenyl oxide sulfonate (Calfax 16-L35, Pilot Chem. Co), and tert-butanol (Sigma Aldrich). Tables 5-8 provide $MnO_4^-$ measurements after 3- and 24-hours as well as % mass loss of $MnO_4^-$ after coupling surfactants/cosolvents with permanganate. FIG. 5 shows the amount of $MnO_4^-$ remaining at various time points. According to the experimentally screened surfactants, the preferred surfactants are still present after twenty-four hours. Other surfactants that can be used as described herein were screened to have shorter lifetimes under the present experimental conditions.

TABLE 6

3-hour observation of 3.5 wt % Surfactant + 5000 mg/L KMnO$_4$

| # | Surfactant Trade Name | Average MnO$_4^-$ (mg/L) | St Dev MnO$_4^-$ (mg/L) | % mass loss |
|---|---|---|---|---|
| 1 | Adsee 799 | 1219 | 1.0 | 76% |
| 2 | Aerosol MA80-I | 1891 | 2.4 | 63% |
| 3 | Aerosol OT | 4865 | 0.4 | 4% |
| 4 | Alfoterra 23 | 2417 | 2.9 | 52% |
| 5 | Brij 97 | — | — | 100% |
| 6 | Calsoft LAS-99 | 377 | 0.1 | 93% |
| 7 | Calfax 10L-45 | 3883 | 2.8 | 23% |
| 8 | Calfax 16L-35 | 4340 | 1.3 | 14% |
| 9 | Calfax DB-45 | 3887 | 2.0 | 23% |
| 10 | Calfax DBA-70 | — | — | 100% |
| 11 | Dowfax 8390 | 4458 | 1.5 | 10% |
| 12 | Dowfax C10L | 3863 | 0.1 | 22% |
| 13 | Dowfax 3B2 | 4277 | 0.1 | 13% |
| 14 | Dowfax 2A1 | 4088 | 1.1 | 19% |
| 15 | HPCD | — | — | 100% |
| 16 | Flo-Mo | — | — | 100% |
| 17 | Glucopon 425N | — | — | 100% |
| 18 | Novell II 1012-21 | 471 | 0.9 | 91% |
| 19 | Pluronic L-43 | — | — | 100% |
| 20 | SDBS | 3442 | 0.1 | 29% |
| 21 | SDS | 4523 | 0.4 | 6% |
| 22 | Teepol 610S | 4012 | 0.2 | 17% |
| 23 | Tween 80 | — | — | 100% |
| 24 | Witconol SN-120 | 193 | 0.8 | 96% |

— indicates there was no MnO$_4^-$ was remaining

TABLE 7

24-hour observation of 3.5 wt % Surfactant + 5000 mg/L KMnO$_4$

| # | Surfactant Trade Name | Average MnO$_4^-$ (mg/L) | St Dev MnO$_4^-$ (mg/L) | % mass loss |
|---|---|---|---|---|
| 1 | Adsee 799 | 1219 | 1.0 | 77% |
| 2 | Aerosol MA80-I | 0 | 0.0 | 100% |
| 3 | Aerosol OT | 4379 | 0.6 | 14% |
| 4 | Alfoterra 23 | 4430 | 0.7 | 92% |
| 5 | Brij 97 | — | — | 100% |
| 6 | Calsoft LAS-99 | — | — | 100% |
| 7 | Calfax 10L-45 | 950 | 0.3 | 82% |
| 8 | Calfax 16L-35 | 4183 | 2.0 | 15% |
| 9 | Calfax DB-45 | 1939 | 0.4 | 61% |
| 10 | Calfax DBA-70 | — | — | 100% |
| 11 | Dowfax 8390 | 3980 | 2.6 | 23% |
| 12 | Dowfax C10L | 1090 | 1.1 | 76% |
| 13 | Dowfax 3B2 | 988 | 0.1 | 80% |
| 14 | Dowfax 2A1 | 2057 | 3.8 | 64% |
| 15 | HPCD | — | — | 100% |
| 16 | Flo-Mo | — | — | 100% |
| 17 | Glucopon 425N | — | — | 100% |
| 18 | Novell II 1012-21 | 34 | 0.4 | 99% |
| 19 | Pluronic L-43 | — | — | 100% |
| 20 | SDBS | 1896 | 0.5 | 61% |
| 21 | SDS | 4393 | 2.5 | 20% |
| 22 | Teepol 610S | 3039 | 0.1 | 38% |
| 23 | Tween 80 | — | — | 100% |
| 24 | Witconol SN-120 | — | — | 100% |

TABLE 8

3-hour observation of 2.5-wt % Cosolvent + 5000 mg/L KMnO$_4$

| # | Cosolvent | Average MnO$_4^-$ (mg/L) | St Dev MnO$_4^-$ (mg/L) | % mass loss |
|---|---|---|---|---|
| 1 | Acetone | 124 | 0.8 | 98% |
| 2 | 1-butanol | — | — | — |
| 3 | 2-butanol | — | — | — |
| 4 | Isopropanol (IPA) | — | — | — |
| 5 | TBA | 5075 | 0.6 | 2% |
| 6 | 1-pentanol | — | — | — |
| 7 | methanol | — | — | — |

TABLE 9

24-hour observation of 2.5-wt % Cosolvent + 5000 mg/L KMnO$_4$

| # | Cosolvent | Average MnO$_4^-$ (mg/L) | St Dev MnO$_4^-$ (mg/L) | % mass loss |
|---|---|---|---|---|
| 1 | Acetone | — | — | — |
| 2 | 1-butanol | — | — | — |
| 3 | 2-butanol | — | — | — |
| 4 | IPA | — | — | — |
| 5 | TBA | 4986 | 0.2 | 4% |
| 6 | 1-pentanol | — | — | — |
| 7 | methanol | — | — | — |

The surfactant DOWFAX 8390 was selected for use in a co-injection flush due to excellent results after coupling with permanganate. In addition, other parameters suggested the use of DOWFAX 8390 including: low sorption to aquifer materials due to its negative surface charge (Desphande et al., Water Research, 34(3): 1030-1036 (2000), non-toxic, biodegradable, recyclable, and reasonable cost (Rouse et al., Environmental Science & Tech., 27(10): 2072-2078).

In that the data in this Example is intended as a proof-of-concept study using the treatments of the present invention, the use of a cosolvent as part of the co-injection solution was decided against to avoid the potential risk of downward vertical migration instead pursuing solubilization rather than mobilization as the DNAPL removal mechanism. Note that remediation systems that rely on Winsor Type I microemulsification will inevitably be less efficient than those implementing Winsor Type III microemulsions, given that solubilization will be lower at the higher interfacial tensions (IFT) required to prevent mobilization.

FIG. 1 shows the effect of surfactant concentration on compatibility with permanganate. The compatibility between DOWFAX 8390 and permanganate is not dependent on surfactant concentration. However, with regard to a nonionic surfactant, for example polyoxyethylene (20) sorbitan monooleate (Tween 80), the surfactant is only compatible at low residual levels with permanganate.

Example 2

2-D Cell Co-Injection Study to Simulate Subsurface Contaminant Treatment

The following Example is provided to simulate field testing a composition and method of the present invention for effectiveness on the treatment of DNAPLs.

The co-injection example was conducted in a two-dimensional (2-D) flow-through cell having dimensions of 30.5 cm×30.5 cm×3.8 cm.

Figure 2:
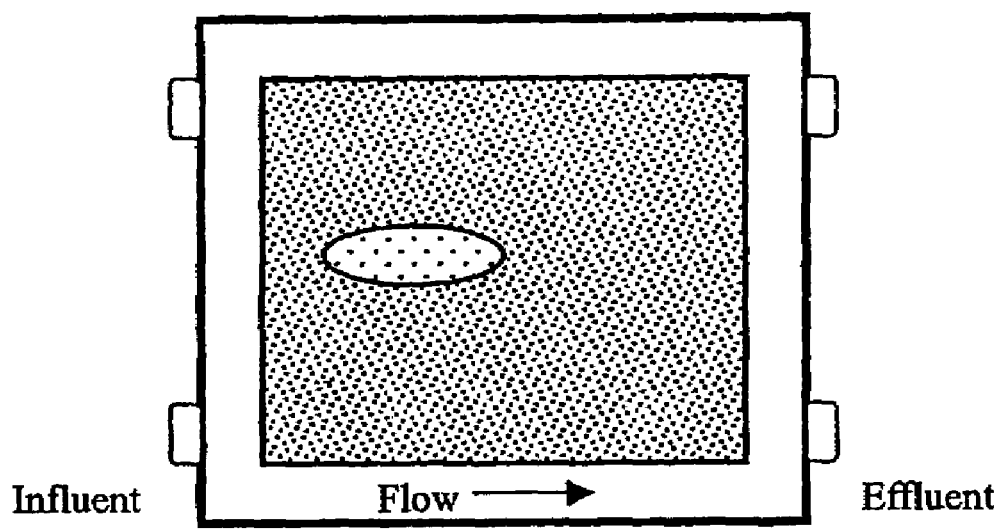
FIG. 2 illustrates a 2-D flow-through cell as used in Example 2 of the present invention.

As shown in FIG. 2, the 2-D flow-through cell has a back panel that contains a 10×10 matrix of 100 sampling ports, each port is spaced about 2.54 cm apart from adjacent ports.

The front panel of the 2-D flow-through cell was made of a tempered glass plate to allow observation. The internal void volume of the cell was about 23 cm×17 cm×2.54 cm (993 cm3).

To prepare the 2-D flow-through cell for use as a groundwater remediation simulation, the internal volume of the cell was wet-packed with de-aired simulated ground water (SGW) that was developed to compositionally simulate natural ground water (Struse A. M. Mass transport of potassium permanganate in low permeability media and matrix interactions. M.S. Thesis. Environmental Science & Engineering Division, Colorado School of Mines, Golden, Colo. (1999). The porous media consists of a #140 mesh size fine-grained silica sand matrix with a medium-grained sand lens (~360 cm3) imbedded within the matrix. The packing configuration represents a DNAPL contaminant zone entrapped in a 2-D zone confined flow diagram. The properties of the silica sands and SGW are provided in Table 10.

TABLE 10

Physical and Chemical Properties of Simulated Ground Water and Silica Sands

Simulated ground water[1]

| Constituent | Concentration (mg/L) |
|---|---|
| Potassium | 0.44 |
| Sodium | 0.27 |
| Iron | 0.44 |
| Magnesium | 17.56 |
| Calcium | 41.23 |
| Chloride | 52.47 |
| Nitrate | 0.73 |
| Sulfate | 98.77 |

Groundwater characteristics

| | |
|---|---|
| pH | 7.2 |
| Alkalinity | 40 mg-CaCO$_3$/L |
| Conductivity | 277 μohms |
| Total Dissolved Solids | 211.9 mg/L |

| Parameter | Units | Value |
|---|---|---|
| Medium-grained Laboratory Sand[2] | | |
| Soil pH (in DI water) | | 6.8 |
| Total organic carbon content | Dry wt. % | 0.017% |
| $d_{10}/d_{60}$ | mm | 0.22/0.60 |
| $K_{sat}$ | cm sec$^{-1}$ | 0.032 |
| #140 Silica Sand[3] | | |
| Particle size fractions: | | |
| Sand | Dry st. % | >99 |
| Silt + clay | Dry wt. % | <0.2 |
| Soil pH (in DI water) | | 7.37 |
| Total organic carbon content | Dry wt. % | <0.017% |
| $d_{10}/d_{60}$ | mm | 0.025/0.079 |
| $K_{sat}$ | cm sec$^{-1}$ | 0.0021 |

[1]Struse A. M. Mass transport of potassium permanganate in low permeability media and matrix interactions. M.S. Thesis. Environmental Science & Engineering Division, Colorado School of Mines, Golden, CO. (1999);
[2]Van Cuyk, S., R. L. Siegrist, A. Logan, S. Masson, E. Fischer, and L. Figueroa. 2001. Hydraulic and purification behaviors and their interactions during wastewater treatment in soil infiltration systems. Water Research 35:35-964 (2001),
[3]Seitz, S. J. Experimental evaluation of mass transfer and matrix interactions during in situ chemical oxidation relying on diffusive transport. M.S. Thesis. Environmental Science & Engineering Division, Colorado School of Mines, Golden, CO. (2004).

An influent and effluent chamber (each 3 cm×3 cm×7 cm) are separated from the packed porous medium with coarse wire mesh dividers covered in fine (0.365 mm) stainless steel mesh. To ensure a uniform flow field within the test zone, the chambers were filled with sieved pea gravel (size fraction used that was retained on a 0.5 mm sieve but passed through a 9.5 mm sieve). A constant head reservoir was connected to the effluent chamber to ensure a constant head boundary over the cell domain and maintain a zero horizontal gradient.

PCE was dyed with Sudan IV (0.1 wt %) to allow for visual observation of the DNAPL throughout the experiment. A dye test was conducted with results validating that a uniform flow field was present within the 2-D flow-through cell, with increased flow through the high permeability lens as expected (data not shown). Prior to the co-injection flush, SGW was flushed through the cell at 48 cm/day (ambient groundwater flow) for three days to establish steady-state PCE dissolution. SGW was used in preparation of the surfactant and oxidant solutions.

Point samples were taken throughout the flush at ports A, B, C, D, E, F, G, and H as well as effluent composite samples. Samples were collected in 0.2 ml inserts that fit within the 2 ml borosilicate glass vials and Teflon-lined caps. For PCE analysis, 0.1 ml of aqueous sample was extracted into 1 ml of hexane, thereby preventing continued oxidation of DNAPL and generation of chloride while permanganate was present in the sample. PCE concentrations were analyzed using a HP-GC, the HP-GC equipped with ECD and auto-sampler. Eight external PCE calibration standards in hexane were prepared at concentration ranges of from 2 mg/L to 5,000 mg/L. The calibration plot was linear ($R2>0.99$) and covered the range of PCE concentrations collected during the flush. DOWFAX 8390 and permanganate concentrations collected during the flush were analyzed using a Hach UV spectrophotometer at wavelengths of 301 nm and 525 nm, respectively.

Figure 3:
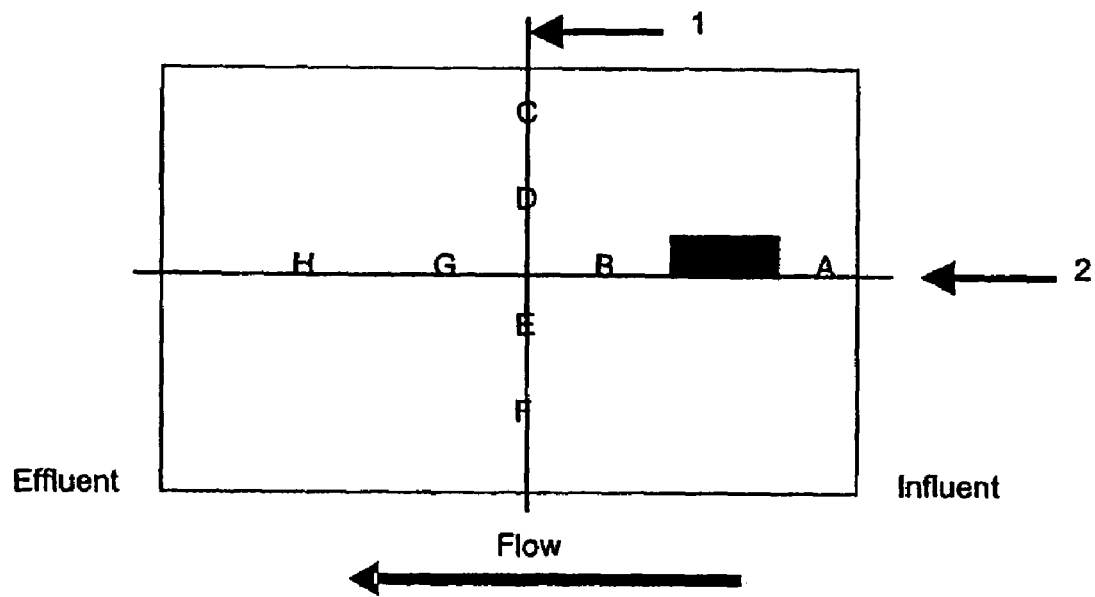
FIG. 3 illustrates the back panel of a 2-D flow-through cell as used in Example 2 of the present invention.

Results: Prior to the start of co-injection flushes, steady state PCE dissolution was established at a flow rate comparable to ambient groundwater flow of 12 cm per day or 0.9 mls per minute. The flushing solution consists of 3.5 wt % DOWFAX 8390 and 4 wt % KMnO$_4$. Two liters (~2 pore volumes (PVs)) of 3.5 wt % DOWFAX 8390 and 4 wt % KMnO$_4$ (approximately 10× the stoichiometric demand of the PCE) solution was delivered to the 2-D flow-through cell by forced gradient flushing at 3.4 mls/min (48 cm/day) for ten hours. Composite aqueous-phase PCE samples were obtained from the effluent sampling port and point samples were obtained from 8 of the back sampling ports. Aqueous PCE samples were extracted in hexane: 0.1 ml of PCE was extracted with 1 ml hexane in a 2 ml borosilicate glass vial with Teflon-coated septa. The sampling ports located on the back of the 2-D flow-through cell are illustrated in FIG. 3. Referring to FIG. 3, transect 1 (as indicated by arrow number 1) is the vertical transect containing the sampling ports C, D, E and F. Transect 2 (as indicated by arrow number 2) is the horizontal transect containing the sampling ports A, B, G and H. Tables 11 and 12 provide the PCE concentrations before, during (at five-hour or 1 PV of flushing), and eight days after the conclusion of the experiment. Surfactant-enhanced PCE DNAPL solubilization and corresponding PCE mass destruction by permanganate is demonstrated most notably in Transect 1 samples where, after five hours of flushing, PCE concentrations along the flow path increase to 1296 mg/L (B), and then decrease to 824 (G) and 183 mg/L (H).

TABLE 11

PCE Concentrations Transects 1 and 2

| Sampling Port | Pre-Flush | During Flush (t = 5 hrs) | 8-Days Post Flush |
|---|---|---|---|
| Transect 1 (mg/L) | | | |
| C | 31 | 28 | <1 |
| D | 50 | 48 | 66 |
| E | 9 | 287 | 33 |
| F | <1 | <1 | <1 |
| Transect 2 (mg/L) | | | |
| A | 146 | 183 | 137 |
| B | 84 | 824 | 118 |
| G | 78 | 1296 | 263 |
| H | 12 | 612 | 1 |

TABLE 12

Effluent PCE Concentrations (mg/L)

| Condition | PCE Concentration |
|---|---|
| Pre-Flush | 12 |
| During Flush (t = 5 hrs) | 6 |
| 8 Days Post-Flush | 37 |

Figure 6:
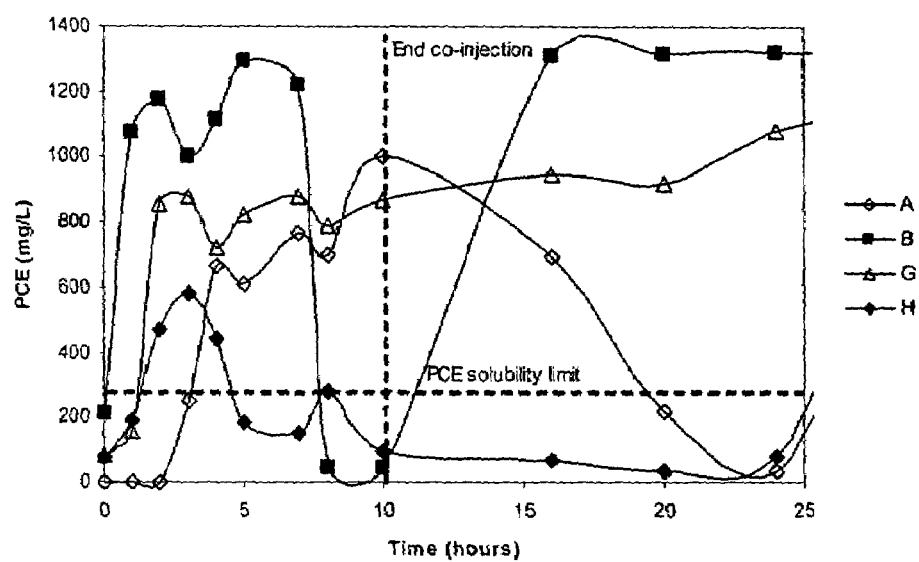
FIG. 6 illustrates the time course of PCE concentration at various points during and after co-injection of surfactants and oxidants at Transect 1.

As shown in FIG. 6, the permanganate/surfactant front entered the PCE source zone approximately 30 minutes after the start of the co-injection flush. PCE concentrations in port B (located directly down-gradient from the source zone) rapidly increased from 213 mg/L to 1078 mg/L indicating surfactant-enhanced solubilization.

Figure 7:
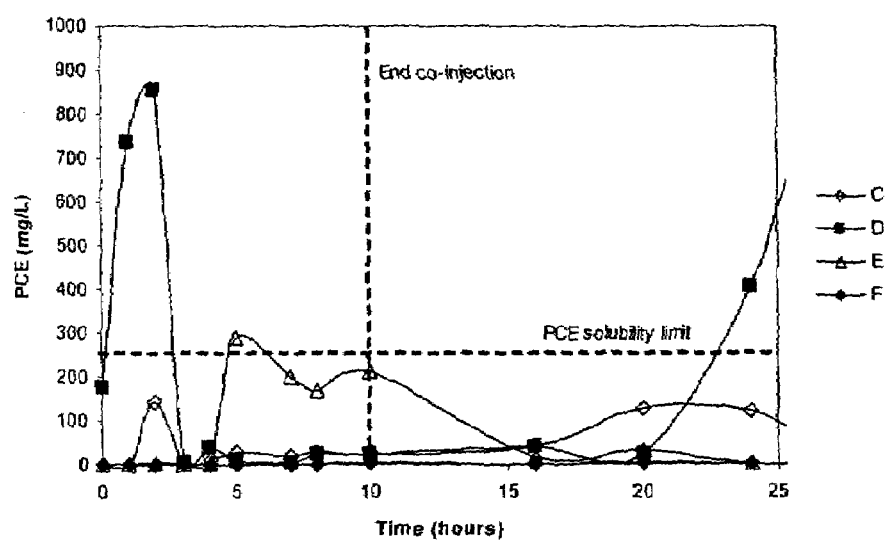
FIG. 7 illustrates the time course of PCE concentration at various points during and after co-injection of surfactants and oxidants at Transect 2.

As shown in FIG. 7, a vertically oriented Transect 2 sampling ports indicate (1) enhanced PCE solubilization, as concentrations in port E increase from 176 to 737 mg/L one hour after the initiation of the co-injection flush and decrease to 3 mg/L two hours later, and (2) the absence of downward vertical migration as PCE concentrations in port F remained relatively constant (<1 mg/L) throughout the co-injection experiment.

At the conclusion of the experiment, ambient groundwater flow rate was reestablished and flushed through the 2-D flow-through cell for two weeks to evaluate post-flush PCE concentrations.

PCE Removal Effectiveness:

The PCE removal effectiveness is the mass of PCE removed during the co-injection experiment as determined from effluent water quality samples taken throughout the co-injection experiment. The 2-D cell experiment was not designed to fully solubilize and destroy 100% of the PCE DNAPL initially present; however, co-injection of surfactant with oxidant did result in 23% mass removal as determined from effluent PCE concentrations taken throughout the 10-hour (2 PV) co-injection experiment. The above example illustrates the usefulness of combined surfactant/oxidant compositions in the treatment of a subsurface PCE contamination.

Example 3

Compatibility of Cosolvents and Surfactants with Permanganate

Batch studies were performed to evaluate the compatibility of alcohol cosolvents and surfactants for use with oxidants during treatment of DNAPLs. Studies were conducted to determine the extent of oxidation between permanganate and either different alcohols or surfactants. Primary, secondary and tertiary alcohols were tested, with alcohols showing resistance to oxidation being considered a strong indicator of compatibility in the compositions of the present invention. Batch experimental results for four particularly useful surfactants and one cosolvent are disclosed that are compatible with the oxidant permanganate, as well as 2D cell experimental results for one particularly useful surfactant Methods:

The methods described here can be used to identify surfactant/oxidant combinations that can be used, or are preferred, in the methods and compositions disclosed herein. Reaction conditions below indicated a favorable coupling when: (1) there was a relatively low oxidant demand defined as less than 25% permanganate consumed throughout the 24-hour reaction period, and (2) the solutions remained purple through the 24 hour reaction period; and (3) relatively few manganese dioxide ($MnO_2$) solids were formed (note that $MnO_2$ solids are a byproduct of oxidation of DNAPL by $KMnO_4$), as these solids are insoluble and typically reduce permeability within a treatment target. Note also that $MnO_2$ solids tend to impede the remedial process in that the injection well can become clogged.

Results:

A hierarchy of reactivity was established in the evaluation of permanganate oxidation of alcohol tracers. Primary alcohols were found to oxidize very quickly (as compared to secondary and tertiary alcohols) to aldehydes or carboxylic acids. Secondary alcohols, e.g., 1,2 butanediol, were less reactive than primary alcohols, resulting in slower oxidation processes. Generally the secondary alcohols resulted in the formation of ketones, which showed good resistance to oxidation. Oxidation of tertiary alcohols resulted in little or no oxidation of the alcohol, providing extremely resistant compounds.

With regard to primary and secondary alcohols, the oxidizing agent ($MnO_4^-$) removes the hydrogen atom from the —OH group, and a hydrogen atom from the carbon atom attached to the —OH group. Tertiary alcohols do not have a hydrogen atom attached to that carbon. It is required that these hydrogen atoms be removed to set-up the carbon-oxygen double bond. The results from this Example revealed less than 2% loss of the tertiary alcohol, tert-butanol, when paired with a solution containing 5,000 mg/L potassium permanganate.

Table 13 provides data illustrating combinations of cosolvents and surfactants with oxidants

TABLE 13

Screening test results for coupling 5,000-mg/L oxidant with surfactants or cosolvents

| Surfactant (1-8 wt %) | Cosolvent (2.5-5 wt %) | $KMnO_4$ (mg/L) | 24-48 hr observation: favorable = Y | Solution Color | Relative Amount of $MnO_2$ Solids Generated |
|---|---|---|---|---|---|
| 1 None | Tert-butanol | 5,000 | Y | Dark Purple | None |
| 2 Dowfax 8390 | None | 5,000 | Y | Dark Purple | Few |

Illustrative compositions of the present invention therefore include any combination of the following: surfactants (Dowfax 8390, AOT, SDS, or Calfax 16L-35)), oxidant ($KMnO_4$), and cosolvent (tert-butanol).

It is understood for purposes of this disclosure, that various changes and modifications may be made to the invention that are well within the scope of the invention. Numerous other changes maybe made which will readily suggest themselves to those skilled in the art and which are encompassed in the spirit of the invention disclosed herein and defined in the appended claims.

The specification contains numerous citations to patents, patent applications, and publications, each is hereby incorporated by reference for all purposes.

What is claimed is:

1. A method of oxidizing a subsurface non-aqueous phase liquid (NAPL) contaminant comprising:
   providing an effective amount of a solution comprising at least one sulfonated surfactant and at least one permanganate chemical oxidant; and
   introducing the solution to the subsurface NAPL contaminant to solubilize and oxidize the subsurface contaminant.

2. The method of claim 1, wherein the non-aqueous phase liquid is a dense non-aqueous phase liquid.

3. The method of claim 2 wherein the dense non-aqueous phase liquid is tetrachloroethene.

4. The method of claim 1 wherein the solution further comprises a cosolvent or cosurfactant.

5. The method of claim 4 wherein the at least one sulfonated surfactant is sodium dioctyl sulfocuccinate, the permanganate chemical oxidant is potassium permanganate and the cosolvent is tertiary butyl alcohol.

6. The method of claim 1, wherein less than 25% of the permanganate chemical oxidant oxidizes the surfactant in a 24 hour period.

7. The method of claim 4, wherein the co-surfactant is a sulfonated co-surfactant.

8. The method of claim 1, wherein the sulfonated surfactant is selected from the group consisting of sodium dioctyl sulfocuccinate, disodium hexadecyl diphenyl oxide disulfonate, sodium dodecyl sulfate and C16 linear sodium diphenyl oxide sulfonate.

9. The method of claim 1, wherein the permanganate chemical oxidant is selected from sodium permanganate and potassium permanganate.

10. The method of claim 1, wherein the solution further comprises a sulfonated cosurfactant.

11. The method of claim 10, wherein the sulfonated surfactant is selected from the group consisting of sodium dioctyl sulfocuccinate, disodium hexadecyl diphenyl oxide disulfonate, sodium dodecyl sulfate and C16 linear sodium diphenyl oxide sulfonate.

12. The method of claim 11, wherein the sulfonated cosurfactant is selected from the group consisting of sodium dioctyl sulfocuccinate, disodium hexadecyl diphenyl oxide disulfonate, sodium dodecyl sulfate and C16 linear sodium diphenyl oxide sulfonate.

* * * * *